(12) United States Patent
Leoutsarakos

(10) Patent No.: US 8,954,758 B2
(45) Date of Patent: *Feb. 10, 2015

(54) PASSWORD-LESS SECURITY AND PROTECTION OF ONLINE DIGITAL ASSETS

(76) Inventor: Nicolas Leoutsarakos, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,769

(22) Filed: Sep. 9, 2012

(65) Prior Publication Data

US 2013/0159732 A1    Jun. 20, 2013

Related U.S. Application Data

(60) Provisional application No. 61/578,224, filed on Dec. 20, 2011.

(51) Int. Cl.
*G06F 11/30* (2006.01)
*G06F 12/14* (2006.01)
*G06F 15/16* (2006.01)

(52) U.S. Cl.
USPC ............................ 713/193; 713/189; 709/248

(58) Field of Classification Search
USPC ................. 713/193, 168–174, 182–186, 202; 709/206, 225, 229, 249, 389; 726/2–8
See application file for complete search history.

(56) References Cited

U.S. PATENT DOCUMENTS

| | | | |
|---|---|---|---|
| 4,885,778 A | 12/1989 | Weiss | |
| 5,657,470 A | 8/1997 | Fisherman et al. | |
| 6,915,435 B1 | 7/2005 | Merriam | |
| 7,302,571 B2 | 11/2007 | Noble et al. | |
| 7,337,331 B2 | 2/2008 | Yoshida | |
| 7,404,085 B2 | 7/2008 | Lacasse et al. | |
| 7,565,297 B2 | 7/2009 | Labaton | |
| 7,761,704 B2 | 7/2010 | Ho et al. | |
| 7,783,900 B2 | 8/2010 | Hacigumus et al. | |
| 7,826,619 B2 | 11/2010 | Hanaoka | |
| 7,836,515 B1 | 11/2010 | Woodward | |
| 7,849,314 B2 | 12/2010 | Kao et al. | |
| 7,895,437 B2 | 2/2011 | Ganesan et al. | |

(Continued)

FOREIGN PATENT DOCUMENTS

JP       2006-033780    2/2006
WO    WO 2010/133353   11/2010

OTHER PUBLICATIONS

Herzberg, Amir, Introduction to Cryptography Subject 6: Resiliency to Corruptions and key Exposures, Jan. 11, 2004, Computer Science Department, Bar Ilan University, 69 pages.

(Continued)

*Primary Examiner* — Evans Desrosiers
(74) *Attorney, Agent, or Firm* — Law Office of Dorian Cartwright

(57) ABSTRACT

Digital assets stored on an asset server by an asset owner are protected without a password. Instead, the digital assets are functionally handicapped by removing at least a portion of digital data (or a key) associated with the digital asset and discarding the key after being sent to an enabling device. The portion of digital data (or a key) is then handicapped by the enabling device by a cryptographic key which is formed from a human gesture and subsequently discarded. When access to the digital asset is requested, an asset owner is notified by the enabling device for approval. A human gesture from the asset owner first provides a key to reconstitute the digital data portion which is transmitted to the asset server to reconstitute the digital asset upon which the access is granted and logged.

17 Claims, 11 Drawing Sheets

(56) References Cited

U.S. PATENT DOCUMENTS

| | | | |
|---|---|---|---|
| 7,907,838 B2 | 3/2011 | Nasiri et al. | |
| 7,921,450 B1 | 4/2011 | Vainstein et al. | |
| 2003/0061503 A1 | 3/2003 | Katz | |
| 2004/0030917 A1* | 2/2004 | Karamchedu et al. | 713/200 |
| 2008/0015995 A1 | 1/2008 | Chen | |
| 2008/0059787 A1 | 3/2008 | Hohenberger et al. | |
| 2008/0065894 A1 | 3/2008 | Wang et al. | |
| 2008/0301775 A1* | 12/2008 | Ollikainen et al. | 726/3 |
| 2009/0196417 A1 | 8/2009 | Beaver et al. | |
| 2009/0327745 A1 | 12/2009 | Dang et al. | |
| 2010/0050244 A1 | 2/2010 | Tarkhanyan et al. | |
| 2010/0107219 A1* | 4/2010 | Thompson et al. | 726/2 |
| 2011/0099379 A1 | 4/2011 | Ganesan et al. | |
| 2011/0246766 A1* | 10/2011 | Orsini et al. | 713/160 |
| 2012/0274550 A1* | 11/2012 | Campbell et al. | 345/156 |
| 2013/0185815 A1 | 7/2013 | Leotsarakos | |

OTHER PUBLICATIONS

Bellare et al., Protecting against Key Exposure: Strongly Key-Insulated Encryption with Optimal Threshold, Department of Computer Science & Engineering, University of California San Diego, Jun. 26, 2002, San Diego, US.

Golle et al., Universal Re-encryption for Mixnets, Topics in Cryptology—CT-RSA 2004, Lecture Notes in Computer Science, 2004, vol. 2964/2004, 1988, Abstract.

EMC2 Webpage, RSA SecureID, www.emc.com/security/index.htm, printed Sep. 2012.

VASCO Data Security Webpage, www.vasco.com/startpage.aspx, printed Sep. 2012.

AES Website Homepage, FIPS, http://csrc.nist.gov/archive/aes/index1.html, printed Sep. 2012.

Rivest, R.L. et al., "A method for obtaining Digital Signatures and Public Key Cryptosystems." Communications of the ACM. Feb. 1978 21(2) pp. 120-126.

Blakley, G.R., Safeguarding Cryptographic Keys, 1979, Proceedings of the National Computer Conference 48: 313-317.

Shamir, Adi, "How to Share a Secret", Programming Techiniques, Communications of the ACM, vol. 22 (11), 612-613, Nov. 1979, doi: 10.1145/359168.359176.

Noar, Moni et al., Visual Cryptography, 14 pages, in Eurocrypt, 1994 Proceedings.

\* cited by examiner

PASSWORD-LESS SECURITY AND PROTECTION OF ONLINE DIGITAL ASSETS

CROSS-REFERENCES TO RELATED APPLICATIONS

This application claims priority under 35 USC 119(e) to U.S. Patent Application No. 61/578,224, by Nicolas Leoutsarakos, entitled SYSTEM AND METHODS FOR PASSWORD-LESS USER AUTHENTICATION, ACCESS CONTROL AND TRANSACTION TRACKING, and filed on Dec. 20, 2011, the contents of which are being hereby incorporated by reference.

FIELD OF THE INVENTION

The invention relates generally to online security, and more specifically, to protection of online digital assets without a password.

BACKGROUND OF THE INVENTION

Use of the Internet, and in particular, of cloud-based storage and applications, is becoming increasingly integral to everyday life. The Internet is a communication medium between end points, such as a mobile device and a server that is openly accessible to the public. Cloud-based storage on an end point of the Internet provides ubiquitous access of user's files and applications from any capable end point. With the increased usage, comes an increased exposure to unscrupulous users of the Internet that can seek to randomly cause havoc or steal sensitive information from specific users.

The traditional paradigm for protection of sensitive information stored in cloud-based locations on the Internet is a password. For access, a user presents log-in credentials to a server that are verified against known credentials stored at the server. Problematically, the comparison paradigm is vulnerable to phishing or key-logging attacks by imposters, hacking or network sniffing, and even guessing by trial and error. Once exposed, the user files and applications are open not only to undetected theft by copying, but to vandalism by deletion. Moreover, the entire account is exposed at once because individually protecting each file and application with a unique password is not practical. Conventional encryption techniques are similarly vulnerable, especially when a cryptography key is stored on an end point.

Furthermore, users are currently burdened with memorizing and protecting more and more passwords. Some users have a single, default password which is not recommended because all accounts are vulnerable to a single password interception. Also, various systems have varying strength requirements for passwords. As a result, users are requested to provide hard to memorize passwords that include numbers, capital letters, or non-traditional characters, adding to user confusion.

What is needed is a technique for protecting digital assets without a password, while overcoming the deficiencies of the prior art.

SUMMARY

To meet the above-described needs, methods, computer program products, and systems for protection of digital assets without a password.

In one embodiment, a digital asset stored on a hosting asset server by an asset owner is functionally handicapped. By removing at least a portion of digital data (either a conceptual 'key', or a cryptographic key) associated with the digital asset and discarding the key after being sent to an enabling device, a digital asset is rendered substantially useless. Additionally, in another embodiment, the key is handicapped by the enabling device with, for example, a conceptual key or a cryptographic key which is formed from a human gesture and subsequently discarded. Consequentially, no complete key is stored on any physical device, thereby reducing the opportunity for compromise.

When access to the digital asset is requested, the asset owner is notified by the enabling device for approval. A human gesture is first provided to reconstitute the key. Next, the key is transmitted to the asset server for reconstituting the digital asset upon which the access is granted. In an embodiment, a log that is admissible in court records accesses.

In some embodiments, more than one key is distributed among hosting and enabling devices in accordance with a secret splitting algorithm (e.g., Shamir algorithm). For instance, vertical co-ownership implements a hierarchical process for approval of an access request. In operation, a request can be granted by a floor salesman device and confirmed by a sales manager device, both of which have a unique key. In another instance, horizontal co-ownership implements a distributed process for approval of an access request by sending keys to multiple owners. Two types of horizontal co-ownership are equal co-ownership (i.e., any co-owner can access independently) and dependent co-ownership (i.e., more than one co-owner necessary to access).

Advantageously, digital assets are secured and protected from hacking, known attacks and other vulnerabilities, and are kept private and confidential, without a password.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for security and protection of digital assets without a password.

Generally, an asset owner protects access to a digital asset by functionally handicapping the digital asset and hiding the key (either a conceptual 'key' or a cryptographic key) for enablement. A digital asset, as used herein, refers to property associated with an owner and including: any digitized property that can be transmitted across a network, such as any data, file (e.g., data or application file, text or multimedia content), group of files, or file system, any source code, firmware, machine code, driver, configuration file, or binary string; or any physical property having online access. Functionally handicapping the digital asset refers to making the digital asset partially or completely unusable in traditional forms by removing parts of the data, encrypting, removing file formatting information, and the like. For example, an asset owner may want to securely store photos, videos, documents, or applications, or may want to control access to an automobile, remotely manage a thermostat, disable a lost iPhone or camera, and the like, without having to use a password. Distributing the key for enablement refers to splitting key and sending parts of the key to enabling devices. In one case, the asset owner is contacted on a mobile device through a call, an SMS message, or by another suitable means of notification. In response, the asset owner can approve a requested access to a digital asset by providing a human gesture. Numerous alternatives are described herein.

Figure 1A:
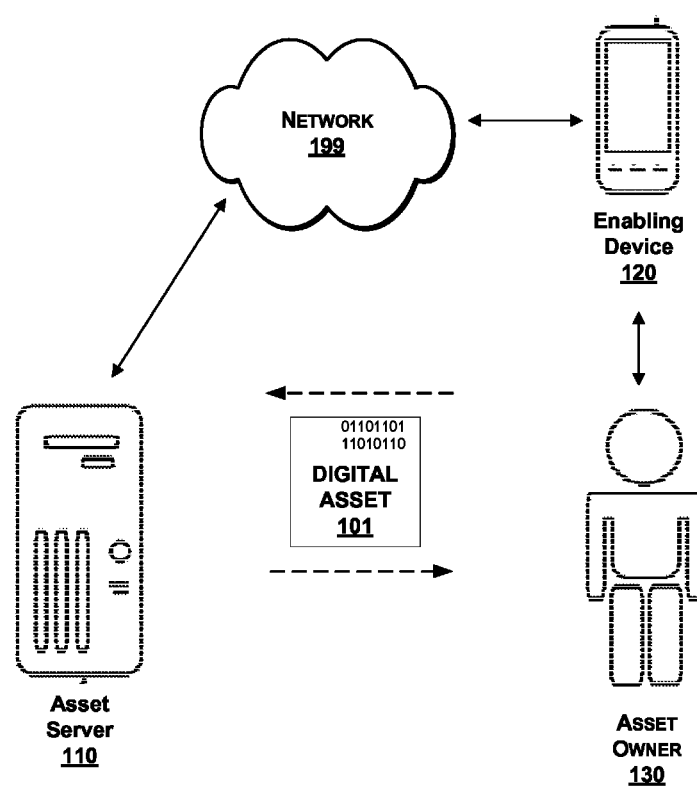
FIG. 1A is a high-level block diagram illustrating a system to protect digital assets without a password, according to one embodiment.
Figure 1B:
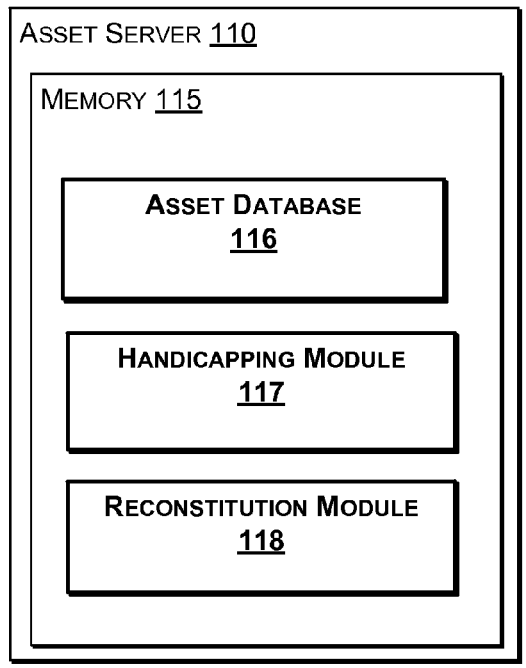
FIG. 1B is a more detailed block diagram illustrating an asset server of FIG. 1A, according to one embodiment.
Figure 1C:
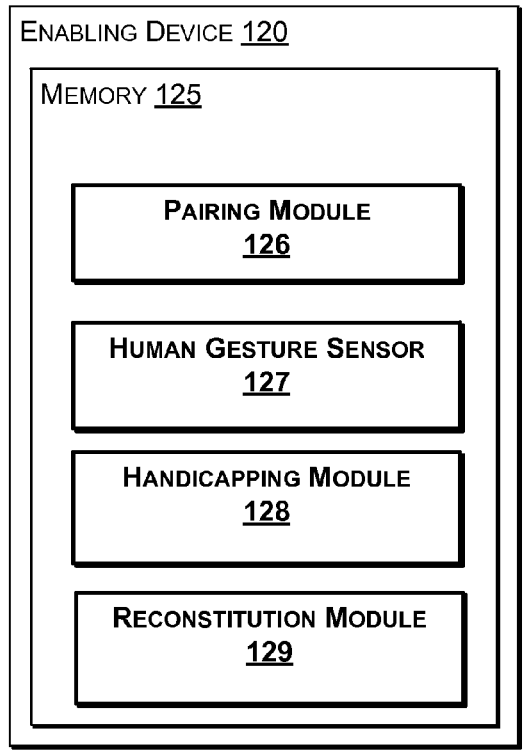
FIG. 1C is a more detailed block diagram illustrating an enabling device of FIG. 1A, according to one embodiment.

Digital Asset Protection Systems (FIGS. 1A-C)

FIG. 1A is a high-level block diagram illustrating a system 100 for protection of digital assets without a password, according to one embodiment. The system 100 comprises an asset server 110, a mobile device 120, and an asset owner 130. From a data flow perspective, the asset owner 130 uses an enabling device 120 to interact with the asset server 110 through a network 199.

The network 199 provides a data communication channel between the enabling device 120 used by the asset owner 130 and the asset server 110. The network 199 can be, for example, the Internet, a data or voice cellular network, or a data local network. The data communication channel can be through any suitable wired (e.g., Ethernet) or wireless (e.g., Wi-Fi or 3G) medium, or combination. Other embodiments of communication channels are possible, including hybrid networks. Additional network components not shown in FIG. 1A can also be part of the system 100, such as firewalls, virus scanners, routers, switches, application servers, databases, and the like.

The asset server 110 manages protection of digital assets, hosted locally and remotely, and also access to digital asset 101. The asset server 110 can be a computer, a set of distributed computers, a server, a virtual server, any passive device that is activated with a host processor, such as a memory device (e.g., a flash drive), or any processor-based device, as described further in FIG. 7. The asset server 110 can be continually connected online, or can connect to the network 199 for the purpose of authorization of access requests. The asset server 110 can be operated by a data storage service, a data center, a mobile telephone company providing service for the enabling device 120, a company associated with the asset owner 130, and the like. Embodiments of the asset server 110 are discussed in more detail below in association with FIG. 1B.

The enabling device 120 provides an interface between the asset owner 130 and the asset server 110. The enabling device 120 is preferably a mobile device that is convenient to the asset owner 130, such as a cellular telephone, a smart cellular telephone, or a tablet computer, as described further in FIG. 7. The enabling device 120 can also be a laptop, a stationary or desktop computer, or the like. Human gestures can be received and processed (e.g., converted to data) by the enabling device 120 for encrypting and decrypting. Some implementations can modify a conventional enabling device by installing a downloaded client or mobile application. Embodiments of the enabling device 120 are discussed in more detail below in association with FIG. 1C.

The asset owner 130 (or asset owners or trusted users) can be an individual user that creates, controls, or utilizes a digital asset. The asset owner 130 can be a sole owner, or could be a co-owner in a horizontal or vertical co-ownership. The digital asset can be personal to the asset owner 130, such as a document, e-mail from work, or home video. The digital asset can also be non-personal, such as a copy of a digital book, a copy of a cell phone application, or firmware for unlocking a car ignition subsystem. Either way, the asset owner 130 is able to control access to the digital asset by approving or denying requests for access. In one example, the asset owner 130 receives a call on a cell telephone from a computer voice indicating that a co-worker would like access to a draft of new company policies. The asset owner 130 can provide to his enabling device a bio-sample (e.g. fingerprint) that is translated to data used to form a key to decrypt a locally stored key on the enabling device 120, which is then sent to the asset server 110 to reconstitute the asset and allow the requested access.

FIG. 1B is a more detailed block diagram illustrating the asset server 110, according to one embodiment. The asset server 110 includes a memory 115 with an asset database 116, a handicapping module 117, and a reconstitution module 118. An optional secret splitting module can also be included.

The asset database 116 stores the digital assets of one or more users in a single memory or a storage network with a protocol-based file system (e.g., a storage area network, or SAN, a network attached storage, or NAS, or the like). The handicapping module 117 can handicap or disable the execution of the digital assets by removing portions of digital data associated with the digital assets (e.g., encrypt with a cryptographic key, remove data, essential data, files, essential files, source code or essential source code) or encrypting the digital asset itself. The digital data portion, or key, is then sent to enabling device 120 for secure storing until digital asset 101 is needed. The reconstitution module 118 restores the digital asset for access by a user when the digital asset portion is decrypted by a human gesture and sent from the enabling device 120.

FIG. 1C is a more detailed bock diagram illustrating the enabling device 120, according to one embodiment. The enabling device 120 includes a memory 115 with a pairing module 126, a handicapping module 127, and a reconstitution module 128. An optional secret splitting module can also be included.

The pairing module 126 sets up a user with the system 100 and enrolls the enabling device 120. The human gesture sensor 127 receives and processes gestures or other input using a touch screen, a speaker, a camera, a gyroscope, or other type of sensor. The handicapping module 128 handicaps a data portion received from the asset server 110 with data from a human gesture provided by the asset owner 130. The reconstitution module 129 restores the digital data portion received from the asset server 110 from the human gesture received for approval of access to a digital asset.

Digital Asset Protection Methods (FIGS. 2-6B)

Figure 2:
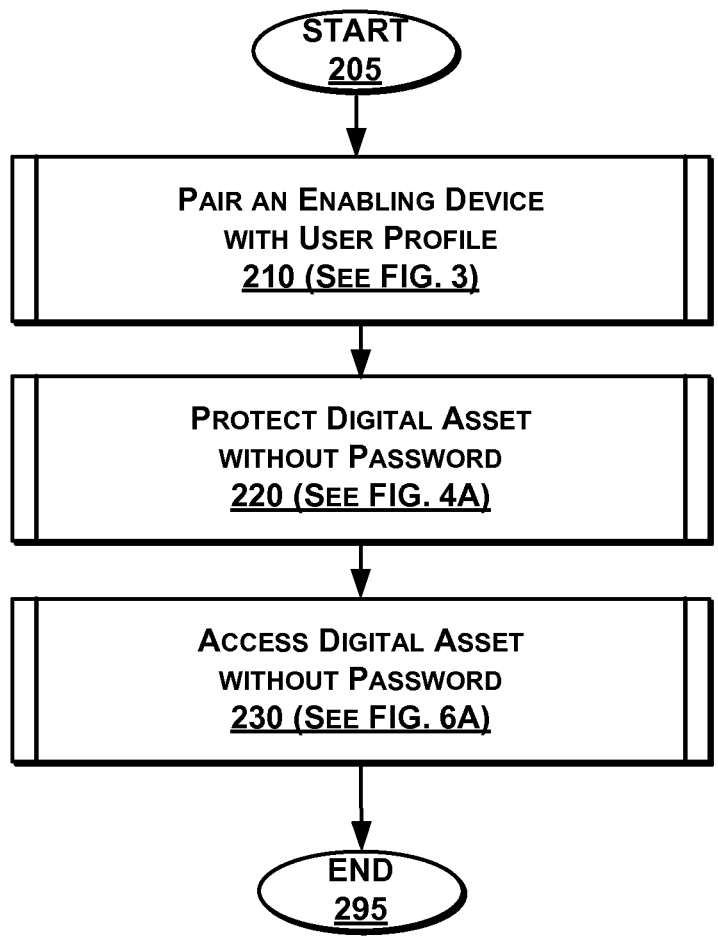
FIG. 2 is a high-level flow diagram illustrating a method for protecting digital assets without a password, according to one embodiment.

FIG. 2 is a high-level flow diagram illustrating a method 200 for protecting digital assets without a password, according to one embodiment. The method 200 can be implemented, in one embodiment, using the system 200 of FIG. 1A. Moreover, the method 200 can be implemented in software, hardware, or a combination of both. The method 200 can be automatically performed (once initialized) without human intervention.

At step 210, an enabling device is paired with a user profile. The user profile is created using information received from a user through a smart phone or a desktop computer. A user may need to log in and manage digital assets. For example, new files can be uploaded, and security settings can be changed for a particular digital asset. To configure a cellular telephone, for instance, for use as an enabling device, a QR (quick response) Code or other indicia is generated and scanned by the cell telephone. An example of pairing is described in FIG. 3.

At step 220, a digital asset is protected without a password. Advantageously, vulnerabilities are eliminated because there is no compare step of the prior art password-based security. Rather than using a password, a portion of data is removed in order to handicap the digital asset. The data portion thereby serves as a key to restoring the digital asset. In some embodiments, the key can be generated when handicapping the digital asset with encryption. The digital asset can be individually secured, be part of a group of files secured by a single key, or file system references to the digital asset can be secured. By comparison to the prior art, a compromised password exposes the unlimited potential of a digital asset in full. On the other hand, by use of the technique disclosed herein, the digital data portion is destroyed within an asset server after being sent to an enabling device. Therefore, there is no data to be compromised using the techniques described herein. In some embodiments, more than one authentication is required to restore a digital asset (e.g., modify a file or run an application). In other embodiments, a secret splitting technique is used to hide a key to a digital asset. A more detailed discussion of how to implement step 220 is set forth below in association with FIG. 5A.

At step 230, a digital asset is accessed without a password. An access to the digital asset can include a download, an update or modification, a delete, move or copy, a double click, a view, an open, or any other operations concerning the digital asset. In one embodiment, an asset owner is contacted via telephone call, SMS or notification message to approve an access to the digital file and request a gesture to authenticate the approval. Afterwards, the data portion extracted in step 220 is reconstituted and returned by the enabling device as a key to restore the digital asset. In other embodiments, more than one authentication is required to restore a digital asset (e.g., secret splitting). Each access can be logged. More details are set provided below in connection with FIG. 6A.

Figure 3:
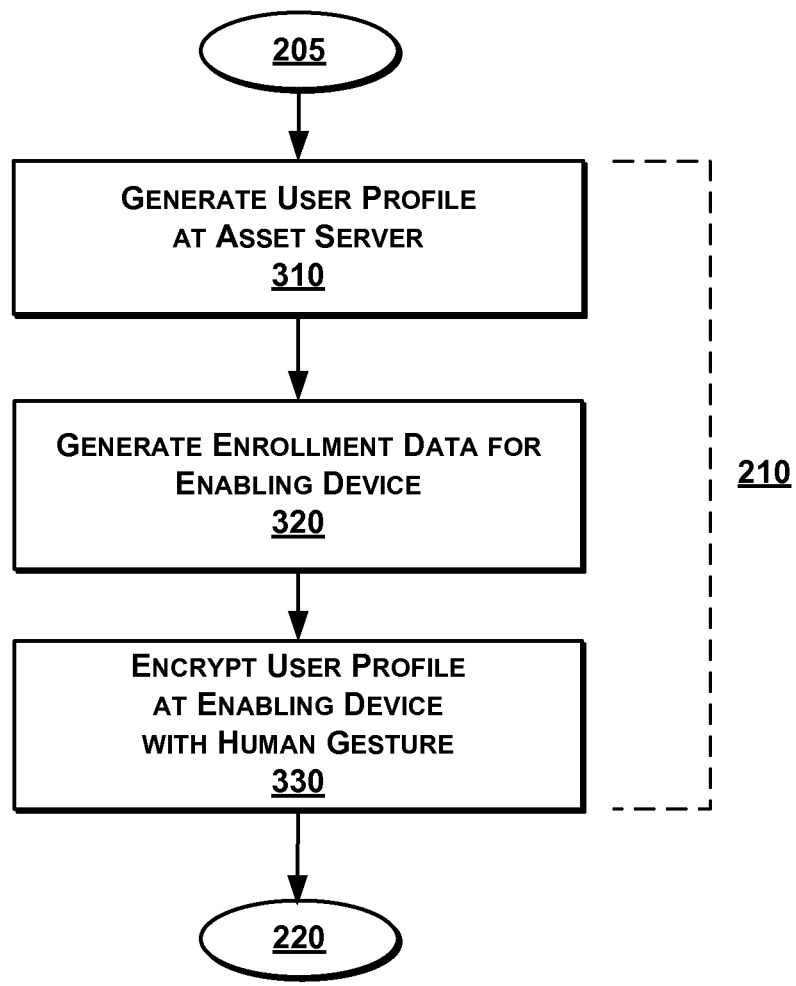
FIG. 3 is a flow diagram illustrating a method of FIG. 2 for pairing an enabling device with a user profile, according to one embodiment.

FIG. 3 is a flow diagram illustrating a method 210 of FIG. 2 for pairing an enabling device with a user profile, according to one embodiment. Given the disclosure herein, one of ordinary skill in the art will recognized that numerous alternatives are available for pairing, other than the following example.

At step 310, a user profile is generated at an asset server. The user profile links an asset owner to digital assets stored on the asset server. An interface linked to the user profile can allow the asset owner to upload and download digital assets, and perform operations such as view, move, copy and delete. The user profile itself can be a protected data asset.

At step 320, enrollment data is generated for an enabling device. In one embodiment, a QR code can be generated for display on a computer screen. The enabling device can scan the QR code to receive encoded information needed for enrollment of the enabling device. In other embodiments, enrollment data can be sent directly to the enabling device using a data network. As a result, a secure communication (e.g. SSL, or secure socket layer) is created between the asset server and the enabling device.

At step 330, a client application is installed at the enabling device. The client application handles communications with the asset server and an asset owner. When a digital data portion is received, the client application requests a human gesture from the asset owner for disablement (e.g. encryption). Likewise, when an access notification is received, the client application requests a human gesture from the owner for enablement (e.g. decryption). Of course some implementations can circumvent the need for any preconfiguring by leveraging existing local applications (e.g., can be integrated to a web browser, an operating system, a semiconductor chip set), streaming applications and cloud-based applications.

Figure 4A:
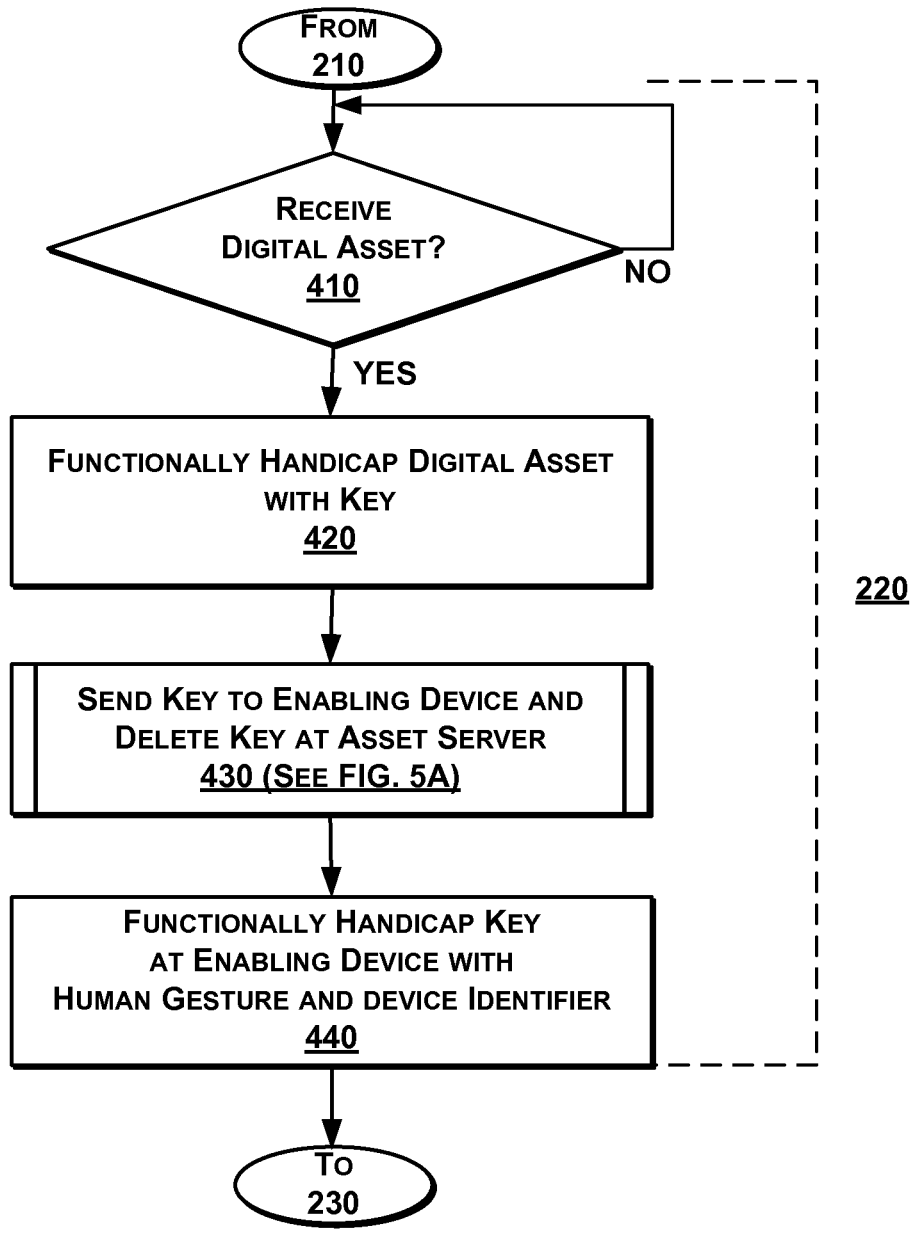
FIGS. 4A-B illustrate a method of FIG. 2 for protecting a digital asset without a password, according to some embodiments.
Figure 4B:
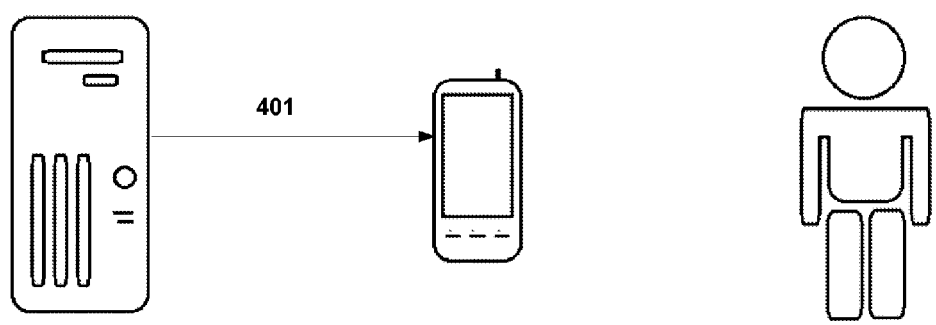
Figure 4B:
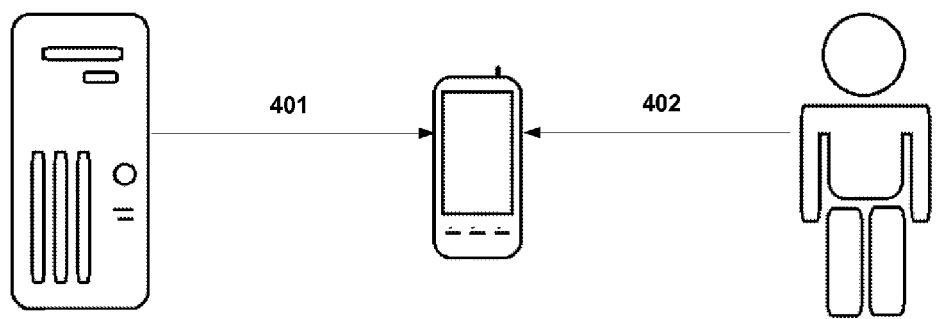

FIG. 4A is a flow diagram and FIG. 4B is a schematic diagram illustrating a method 220 of FIG. 2 for protecting a digital asset without a password, according to one embodiment. At step 410, the process awaits receipt of a digital asset. Once a digital asset is received for storage in an asset database, the disabling/enabling process begins.

At step 420, a portion of digital data associated with the digital asset is removed to handicap the digital asset. The portion can be part of the digital asset itself, or peripheral data. In one embodiment, the digital asset is encrypted with a symmetric or asymmetric key, and the key or a portion of the key is removed. In another embodiment, bits of data are removed from the digital asset itself. For example, a sensitive part of a document can be targeted for removal so that even if the document is somehow restored, the sensitive parts of the document are not present. The removal can also be randomly-located. Fake bits can be substituted for removed bits to hide location. The number of bits removed should exceed correction capabilities by CRC (cyclic redundancy check) and the like, and the number of bits can be based on a type of digital asset or security level. In still another example, configuration data needed to view or execute a digital asset are removed (e.g., DLL, or dynamic linked library, files). For example, a Word or .DOC file includes a metadata portion that is needed to decode the data file. In some implementations, data assets on an asset server appear as a list of files with unknown file types by removing file formatting data. Consequentially, a hacker looking for a certain type of file will be set back even further. In yet another embodiment, hardware operation is handicapped by substantially altering its firmware. The hardware, which can be an automobile, a garage door opener, a computer terminal, or any other protected physical device, is rendered inoperable until authorized.

At step 430 (and interaction 401), the key (or asset data portion) is sent to an enabling device and removed from an asset server. In some embodiments, the digital data portion can be sent to multiple enabling devices, as discussed below with respect to FIGS. 5A-B. A user profile can be checked to find an enabling device of the asset owner. Once the digital data portion is confirmed as being received by the enabling device, the digital data portion is securely erased from volatile or permanent memory on the asset server. The data can be merely disassociated with any file system entry, or securely removed to prevent recovery. By removing the digital data portion, there is no local key for decrypting, or otherwise reconstituting the digital asset in case the asset server is compromised. Further, there is no link to the enabling device, leaving no trace of how to find the enabling data portion.

In some embodiments the key (or asset data portion) is only partially removed from an asset server. In more detail, a secret splitting algorithm can be utilized to generate a derivative key stored on the asset server away from the digital asset. As a result, any access of the digital asset can be logged by the asset server, even if a copy is stored locally on a remote storage device. The secret splitting algorithm generates unique derivative keys for the enabling device or devices. One way to generate derivative keys is to randomly select data points along a polynomial graph. Each unique data point is potentially a unique derivative key.

At step 440 (and interaction 402), the key (or asset data portion) is functionally disabled with a human gesture and device identifier. First, the key can be encrypted or otherwise handicapped by the enabling device. In turn, the cryptographic key or removed bits can be hidden from the enabling device for further protection by applying a secret splitting algorithm. The splitting algorithm produces derivative keys of the received key (which itself can be a derivative key of the cryptographic key used to disable the digital asset at the asset server). Specifically, a first derivative key is generated from a unique identifier of the enabling device, such as a serial number, a NIC number, a static IP address, a MAC address or the like. The unique identifier is plugged into the secret splitting algorithm and the resulting first derivative key, which is now tied to the enabling device and cannot be reconstituted from another device, is stored at the enabling device. Further, a second derivative key is generated from human gesture data received. Information used to derive the key (or asset data portion) can then be discarded from the enabling device, effectively hiding the key.

Besides a human gesture, any other type of human-input data can be used, such as a voice pattern, a retina pattern, fingerprint, or facial scan. Data from a human gesture is securely discarded from the enabling device as soon as a key (or asset data portion) is disabled or reconstituted. In some implementations, data from a human gesture can be stored and automatically supplied in lieu of availability of the asset owner. The human gesture can be stored separately from an enabling device and automatically provided, for example, in low security environments such as access to view movies. If the asset owner loses confidence in the automatic process, it can be easily terminated or updated with a new human gesture.

Figure 5A:
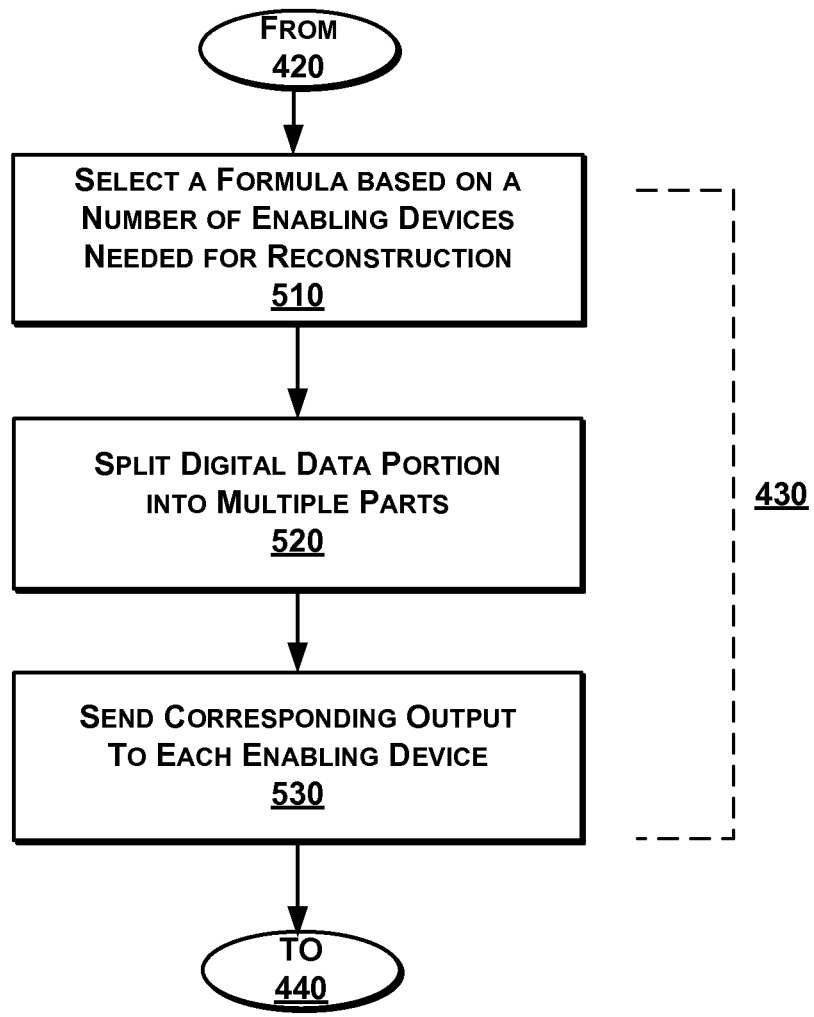
FIGS. 5A-B illustrate a method of FIG. 4A for sending sub-portions of a digital data portion to multiple enabling devices using a secret splitting algorithm, according to some embodiments.
Figure 5B:
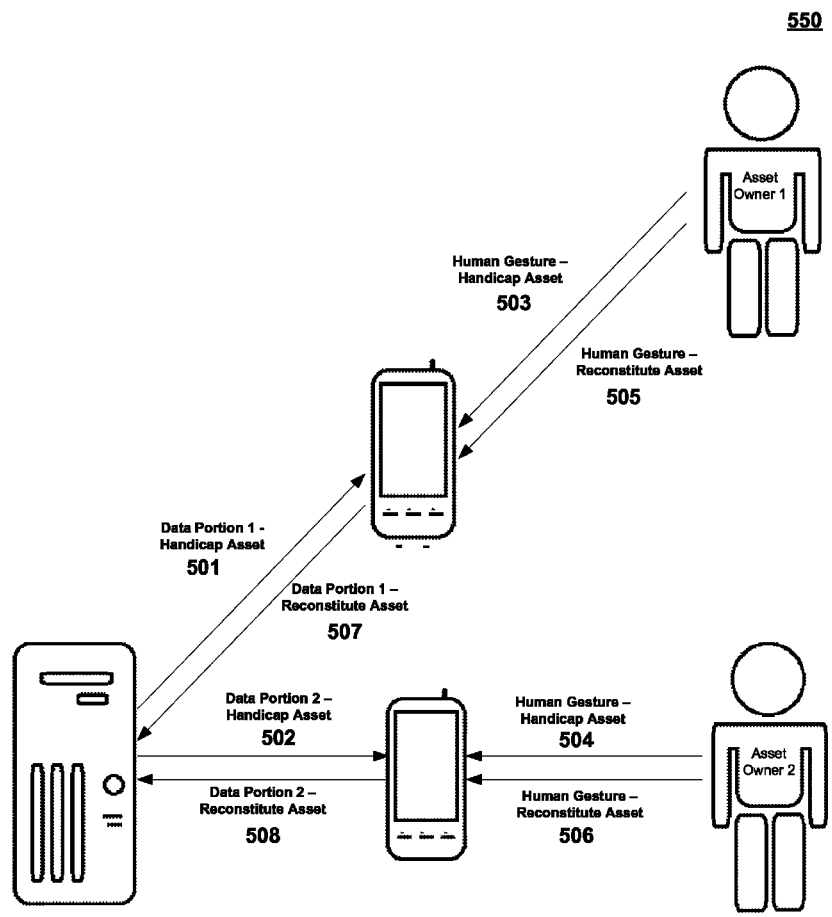

FIG. 5A is a flow diagram and FIG. 5B is a schematic diagram illustrating a method 430 of FIG. 3 for sending sub-portions (or derivatives) of a digital data portion to multiple enabling devices using a secret splitting algorithm, according to some embodiments. For example, a Shamir polynomial decomposition and recomposition algorithm can be employed to divide a secret into unique parts and give each enabling device a unique part of the secret. In a threshold scheme of secret sharing, any threshold number of enabling devices can trigger recomposition, rather than needing all enabling devices. For example, any two management employees can be required to access certain financial data.

In some embodiments, the asset data portion is distributed among the asset server and multiple enabling devices. In a horizontal architecture of multiple enabling devices, a digital asset portion is split among the enabling devices from an asset server. Each of these enabling devices may also be needed for reconstitution. But in some embodiments, only a threshold number of enabling devices is needed for reconstitution. The threshold number is less than the total number of enabling devices. For instance, any three of ten enabling devices can be required for reconstitution. In a vertical architecture of multiple enabling devices, a digital asset portion is sent to a first enabling device, where it is split and the split portion sent to a second enabling device. The second enabling device can again split received data, and so on.

At step 510, a formula is selected based on a number of enabling devices that are needed for reconstruction. The coefficients of the polynomial are set based on input received. For example, a jointly-owned project may require each of the enabling devices for reconstructions, while an employee-only project may require at least one of many employees. The same formula is used for decomposition.

At step 520, a digital data portion is split into multiple parts. The parts can have some overlap, be mutually exclusive, or some parts can be duplicates. Most importantly, all of the information needed to reconstitute a digital asset is not available on an asset server. Consequentially, digital assets stored on a compromised asset server are still protected. As discussed, the splitting can be performed at an enabling device and split parts passed to other enabling devices in a hierarchy.

A secret splitting algorithm can be utilized to generate multiple keys. In more detail, a key is used as a constant in a polynomial equation. Any number of keys can be generated as data points on the polynomial graph. The specific form of the equation depends on how many unique keys are being distributed. For a line (e.g., ax+y), only two data points are needed as input to solve for reconstitution. For a parabola (e.g., $ax^2+bx+y$, etc.), at least three data points are needed as input to solve for reconstitution. An example polynomial can be $SSS+87x+34x^2$, where SSS is a constant representing a cryptographic key or data portion used for handicapping the digital asset. To generate a point on the graph to be used as a derivative key stored at an asset server or sent to an enabling device, a random value within a valid range of x is input to the polynomial and a y value is output. The resulting x,y data point is the derivative key, in some embodiments. To reconstitute the discarded polynomial, a requisite number of x,y data points are provided (e.g., from asset server and at least one enabling device), as described herein.

In one embodiment, a Shamir secret splitting algorithm is implemented. To derive a polynomial, Shamir uses the well-known Lagrange polynomial interpolation formula. Alternative secret splitting algorithms can also be implemented, such as the Mignotte scheme (using Chinese remainder Theorem) or the Blakely scheme.

At step 530 (interactions 501, 502), one of the parts is sent to each of the enabling devices. Rather than sending the parts to a single enabling device, the parts are distributed to more than one end point. Each enabling device encrypts the parts with a human gesture (interactions 503,504). Additionally, one of the parts can be stored on an asset server, apart from the digital asset. All other data is destroyed at the asset server for security, in some embodiments, including the polynomial used to generate keys, and keys sent to an enabling device. The key is effectively hidden at the enabling device, away from any hacker, by getting rid of the key altogether. Even if the enabling device is compromised, part of the key has been hidden by the human gesture, as described herein.

A horizontal co-ownership is illustrated in FIG. 5B. Two types of horizontal co-ownership include equal co-ownership and distributed co-ownership. In equal co-ownership, a separate polynomial is used to generate keys for each co-owner. There is no dependency as each co-owner can access the digital asset without an accord. Meanwhile, in a distributed co-ownership, a single polynomial is used to generate keys for each co-owner. The dependency in this case to access to the digital asset requires keys from each or a subset of co-owners.

The return path is also illustrated in FIG. 5B, in which upon notification of an access request, human gestures are received (interactions 505, 506) in order to release the parts back to the asset server (interactions 507, 508).

Figure 6A:
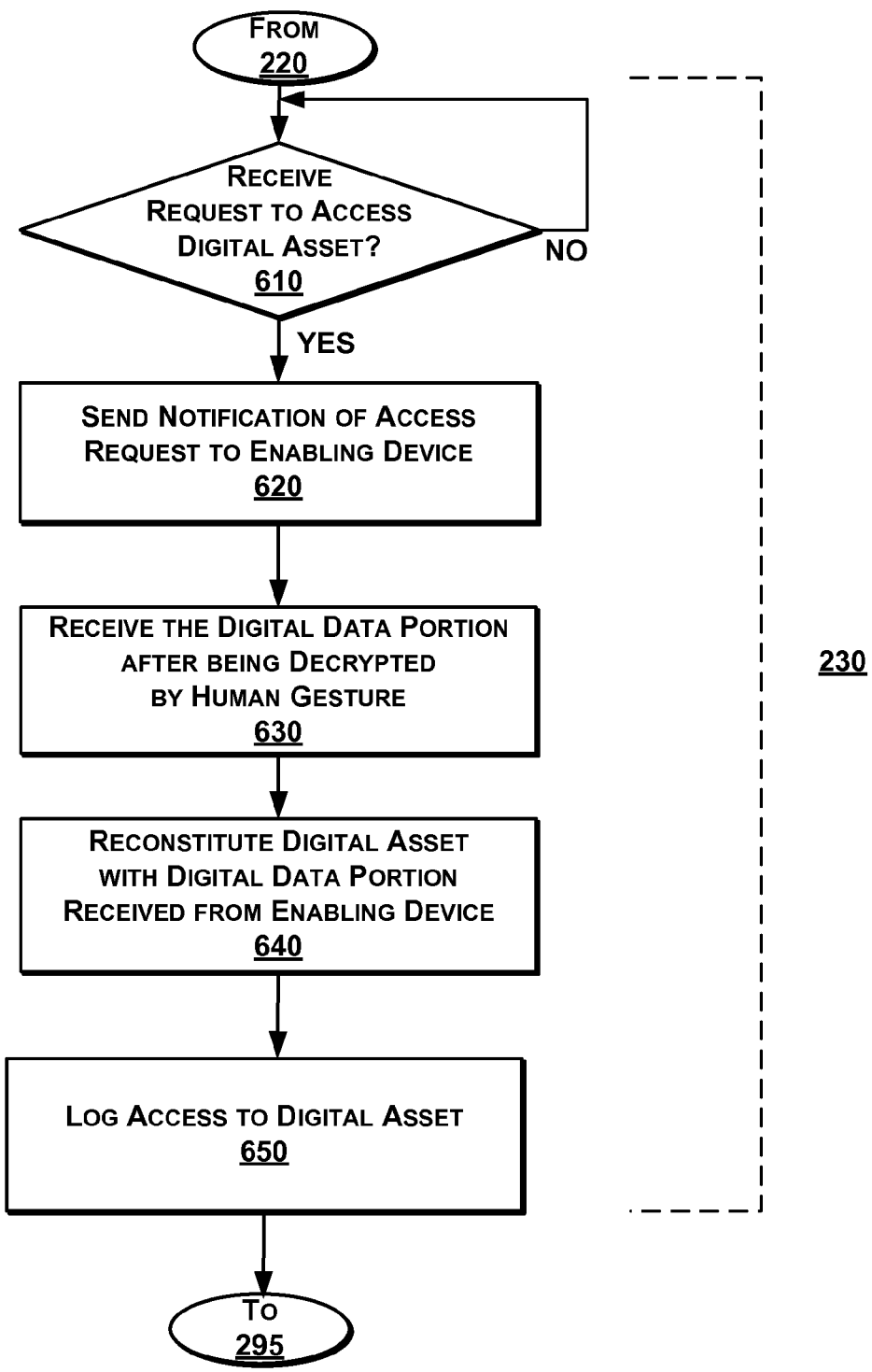
FIGS. 6A-B illustrate a method of FIG. 2 for accessing a digital asset without a password, according to some embodiments.
Figure 6B:
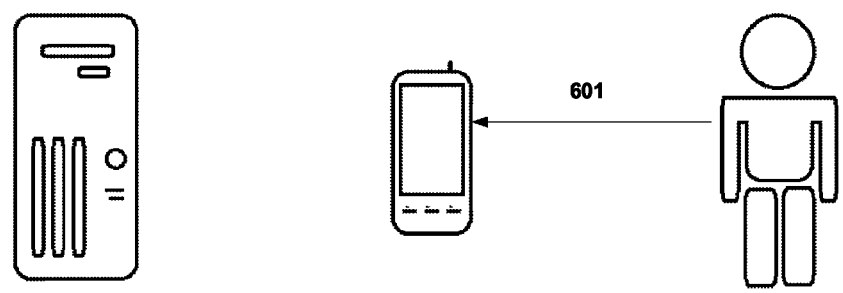
Figure 6B:
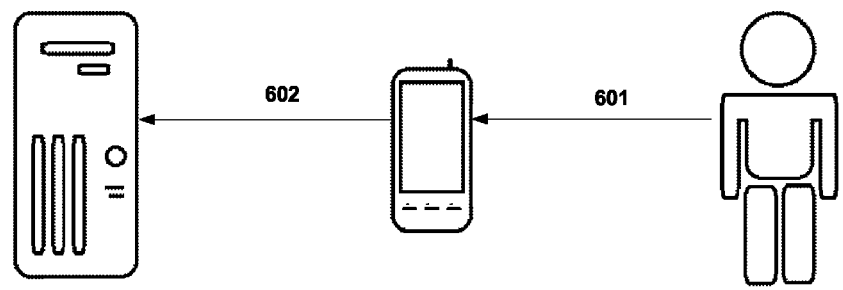

FIG. 6A is a flow diagram and FIG. 6B is a schematic diagram illustrating a method 230 of FIG. 2 for accessing a digital asset without a password, according to some embodiments. Specifically, FIG. 6A is a flow diagram illustrating a method 230 of FIG. 2 for accessing a digital asset without a password. At step 610, the process awaits receipt of a request to access a digital asset. The request can be received from an asset owner, or a non-owner, and from a human or an automated computer process.

At step 620, a notification is sent to an enabling device for the data portion. In some embodiments, multiple enabling devices are notified. In turn, the enabling device notifies the asset owner about the requested access, although the request could have been initiated from the asset owner. The notification can include additional information for the asset owner, such as who is requesting access and what type of access is needed.

At step 630, a data portion is received (interaction 602) after being reconstituted by a human gesture (interaction 601). If the asset owner wants to approve the access request, a corresponding gesture is input to the enabling device. The gesture can be a two-dimensional or three-dimensional movement of the hand or other body parts. In some embodiments, other forms of input can be implemented, such as a retina scan or fingerprint. Data from the human gesture forms a key that is used to decrypt the digital data portion for transmission. Optionally, a data asset owner can assign access privileges associated with his gestures to use on-the-fly if not already preconfigured through a user profile. Privileges can include quantity and quality of access allowable and instructions to be followed by the asset server. For example, the privilege level can be encoded in a variation of the human gesture (e.g., one wink with retina scan for partial access, and two winks with retina scan for full access). Alternatively, a pop-up can be spawned on a display screen with a checkbox for access options.

At step 640, a digital asset is reconstituted using the digital data portion received from the enabling device. In one embodiment the digital data portion received from the enabling device is used as a key to decrypt the digital asset for use as requested.

At optional step 650, access to the digital asset is logged. Because all the steps to access a digital asset are e-signed by the participants (systems or humans), the log may be admissible to court as an identification and authentication of the person accessing the digital asset. Additionally, license restrictions can be enforced by recording quantities and durations of access.

Figure 7:
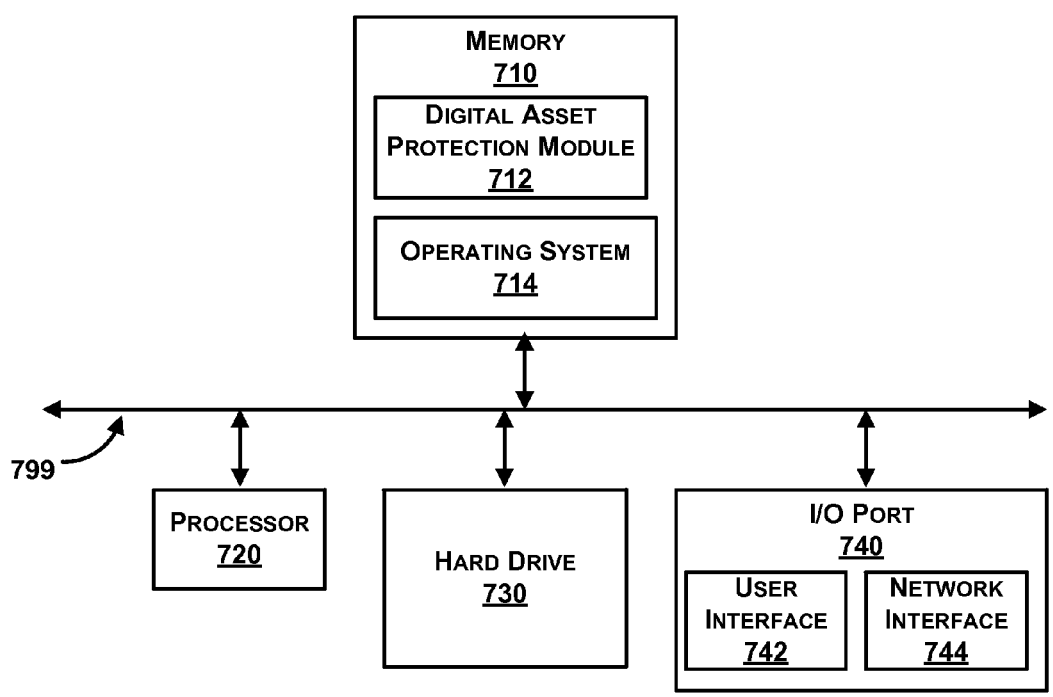
FIG. 7 is a block diagram illustrating an exemplary computing device, according to one embodiment.

Exemplary Computing Device (FIG. 7)

FIG. 7 is a block diagram illustrating an exemplary computing device 700 for use in the system 100 of FIG. 1, according to one embodiment. The computing device 600 is an exemplary device that is implementable for each of the components of the system 100, including the asset server 110 and the enabling device 120. Additionally, the system 100 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 799. Communication can be digital and/or analog, and use any suitable protocol.

The memory 710 further comprises a digital asset protection module and an operating system 722. The digital asset protection module 712 can include the modules of the asset server 110 and the enabling device 120, as represented generally by a digital asset protection module 712. Other modules stored in memory can include a web browser application, a web-browser-based application, a mobile application, a streamed application, a locally-installed application, and the like.

The operating system 722 can be one of the Microsoft Windows® family of operating systems (e.g., Windows 2000, Windows XP, Windows XP x64 Edition, Windows Vista, Widows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 720 can be single core, multiple core, or include more than one processing elements. The processor 620 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 642 and a network interface 744. The user interface 642 can output to a display device and receive input from, for example, a keyboard. The network interface 744 connects to a medium such as Ethernet or Wi-Fi for data input and output.

Many of the functionalities described herein can be implemented with computer software, computer hardware, computer firmware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Bluetooth, LTE, Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for protecting a digital asset on an asset server with a key and destroying the key, the method, comprising the steps of:
    storing the digital asset on the asset server;
        disabling the digital asset, comprising:
            handicapping the digital asset on the asset server with security data to prevent normal use of the digital asset, by removing a portion of bits from the digital asset itself to prevent normal use of the digital asset;
            sending the security data from the asset server to the remote device, wherein the remote device handicaps the security data with a second security data based on a user gesture to prevent normal use of the security data, wherein the second security data is completely discarded from the remote device; and
            completely discarding the security data from the asset server, wherein the digital asset remains disabled on the asset server; and
        enabling the digital asset, comprising:
            receiving the security data from the remote device responsive to a request to access the digital asset, wherein the remote device reconstitutes the second security data from user gesture and uses the second security data to enable the security data that was handicapped by the remote device for normal use of the security data; and
            reconstituting the digital asset using at least the security data in order to enable the digital asset that was handicapped by the asset server for normal use of the digital asset.

2. The method of claim 1, wherein handicapping comprises:
    handicapping the digital asset with a cryptographic key to prevent normal use.

3. The method of claim 1, wherein unique human input comprises a two-dimensional or a three-dimensional human gesture.

4. The method of claim 1, wherein unique human input comprises a bio-sample, a retina scan, a facial scan, a fingerprint scan, and a voice sample.

5. The method of claim 1, wherein receiving security data from the remote device comprises:
    receiving the security data from the remote device which has decrypted the security data with data from a received unique human input.

6. The method of claim 5, further comprising:
    storing one of the at least two keys on the asset server apart from the digital asset.

7. The method of claim 1, wherein sending the security data to a remote device, wherein the remote device handicaps the security data comprises:
    the remote device encrypting the security data with a unique identifier associated with the enabling device.

8. The method of claim 1, wherein sending the security data to a remote device, wherein the remote device handicaps the security data, comprises:
    generating at least two derivatives of the security data, the two derivatives corresponding to two keys; and
    sending one of the at least two keys to the remote device.

9. The method of claim 8, wherein generating the at least two derivatives corresponding to two keys comprises:
    using a polynomial of a Shamir-type secret splitting algorithm to derive at least two data points which correspond to at least two keys.

10. The method of claim 1, further comprising:
    receiving a request to access the digital asset; and
    in response, sending a notification to the remote device to send the security data for reconstitution.

11. The method of claim 1, further comprising:
    logging each access to the digital asset, regardless of whether the digital asset is stored at the asset server.

12. The method of claim 1, wherein the digital asset comprises at least one of: data, multimedia, an executable application, a configuration file, machine code, and source code.

13. The method of claim 1, wherein the remote device comprises a wireless mobile device.

14. The method of claim 1, wherein the digital asset comprises at least one of: a digital asset, a group of digital assets, and a file system referring to the digital asset.

15. A computer-implemented method for protecting a digital asset on an asset server from a remote device with a key and destroying the key, the method comprising the steps of:
    receiving at least security data associated with the digital asset that has been handicapped to prevent normal use of the digital asset, from the asset server, and wherein the digital asset remains intact on the asset server and the security data has been completely discarded from the asset server;
    disabling the security data:
        receiving a unique human input from an owner of the digital asset;
        handicapping the security data with data from the unique human input; and
        completely discarding the second security data from the remote device enabling the security data:
        responsive to receiving a notification for a request for access to the digital asset, requesting the unique human input from the owner of the digital asset;
        reconstituting the security data with the unique human input; and
        sending the security data to the asset server to reconstitute the digital asset for normal use.

16. A non-transitory computer-readable medium storing source code that, when executed by a processor, performs a method for protecting a digital asset on an asset server with a key and destroying the key, the method comprising the steps of:
    storing the digital asset on the asset server;
    disabling the digital asset, comprising:
        handicapping the digital asset on the asset server with security data to prevent normal use of the digital asset, by removing a portion of bits from the digital asset itself to prevent normal use of the digital asset;
        sending security data from the asset server to the remote device, wherein the remote device handicaps the security data with a second security data based on a user gesture to prevent normal use of the security data, wherein the user gesture is not stored on the remote device; and completely discarding the security data from the asset server, wherein the digital asset remains disabled on the asset server; and enabling the digital asset, comprising:

receiving the security data from the remote device responsive to a request to access the digital asset, wherein the remote device reconstitutes the second security data from user gesture and uses the second security data to enable the security data that was handicapped by the remote device for normal use of the security data; and reconstituting the digital asset using at least the security data in order to enable the digital asset that was handicapped by the asset server for normal use of the digital asset.

17. A system to protect a digital asset on an asset server, comprising:

a processor; and a memory to store the digital asset, the memory comprising;

a handicapping module to handicap the digital asset with security data to prevent normal use, by removing a portion of bits from the digital asset itself to prevent normal use of the digital asset, to send the security data to a remote device, wherein the remote device handicaps the security data, the security data being independent from the digital asset, and discard the security data, wherein the digital asset remains disabled on the asset server; and a reconstitution module to receive the security data from a remote device, and reconstitute the digital asset using the security data to enable the digital asset for normal use.

* * * * *